US011613255B2

(12) United States Patent
Reuter et al.

(10) Patent No.: US 11,613,255 B2
(45) Date of Patent: *Mar. 28, 2023

(54) REDUNDANT ENVIRONMENT PERCEPTION TRACKING FOR AUTOMATED DRIVING SYSTEMS

(71) Applicant: Robert Bosch GmbH, Stuttgart (DE)

(72) Inventors: Stephan Reuter, Elchingen (DE); Thomas Benjamin Gussner, Ludwigsburg (DE); Theresa Veronika Kienle, Stuttgart (DE); Oliver F. Schwindt, Sunnyvale, CA (US); Andreas Heyl, Sunnyvale, CA (US); Joachim Carsten Mueller, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 108 days.

This patent is subject to a terminal disclaimer.

(21) Appl. No.: 17/203,428

(22) Filed: Mar. 16, 2021

(65) Prior Publication Data

US 2021/0213944 A1 Jul. 15, 2021

Related U.S. Application Data

(63) Continuation of application No. 16/888,149, filed on May 29, 2020, now Pat. No. 10,981,568.
(Continued)

(51) Int. Cl.
*B60Q 1/00* (2006.01)
*B60W 30/095* (2012.01)
(Continued)

(52) U.S. Cl.
CPC ......... *B60W 30/0956* (2013.01); *G06V 20/58* (2022.01); *G08G 1/16* (2013.01); *B60W 2420/52* (2013.01); *B60W 2554/80* (2020.02)

(58) Field of Classification Search
CPC ......... B60W 30/0956; B60W 2420/52; B60W 2554/80; B60W 2420/42; B60W 2420/54;
(Continued)

(56) References Cited

U.S. PATENT DOCUMENTS 7,135,992 B2 11/2006 Karlsson et al.
10,109,198 B2 10/2018 Qiu et al.
(Continued)

*Primary Examiner* — Toan N Pham
(74) *Attorney, Agent, or Firm* — Michael Best & Friedrich LLP

(57) ABSTRACT

Redundant environment perception tracking for automated driving systems. One example embodiment provides a surveillance system, the system including a plurality of sensors, a memory, and an electronic processor. The electronic processor is configured to receive, from the plurality of sensors, environmental information of a common field of view, generate, based on the environmental information, a plurality of hypotheses regarding an object within the common field of view, the plurality of hypotheses including at least one set of hypotheses excluding the environmental information from at least one sensor of a first sensor type, determine, based on a subset of the plurality of hypotheses, an object state of the object, wherein the subset includes the at least one set of hypotheses excluding the environmental information from the at least one sensor of the first sensor type, and track the object based on the object state that is determined.

20 Claims, 5 Drawing Sheets

Related U.S. Application Data

(60) Provisional application No. 62/854,804, filed on May 30, 2019.

(51) Int. Cl.
*G08G 1/16* (2006.01)
*G06V 20/58* (2022.01)

(58) Field of Classification Search
CPC ......... B60W 2552/53; B60W 2554/00; B60W 30/09; B60W 30/08; B60W 2552/00; B60W 2554/4023; B60W 2554/4029; G08G 1/161; G08G 1/166; G08G 1/16; H04W 4/023; H04W 24/08; H04W 4/027; H04L 43/0882; G06V 20/58; G06V 10/80; G06K 9/6288; G05D 1/021; G05D 1/0231; G05D 1/0255; G05D 1/0257
See application file for complete search history.

(56) References Cited

U.S. PATENT DOCUMENTS

| | | |
|---|---|---|
| 11,392,804 B2 * | 7/2022 | Feyerabend ......... G06K 9/6278 |
| 2008/0162010 A1 | 7/2008 | Klotz et al. |
| 2009/0103779 A1 | 4/2009 | Loehlein et al. |
| 2018/0261095 A1 | 9/2018 | Qiu et al. |
| 2019/0004177 A1 | 1/2019 | Shand |
| 2019/0050653 A1 * | 2/2019 | Natroshvili .......... G06N 3/0454 |
| 2019/0088148 A1 | 3/2019 | Jacobus et al. |
| 2019/0126922 A1 | 5/2019 | Natroshvili |
| 2021/0009121 A1 * | 1/2021 | Oboril ............... B60W 50/0097 |
| 2021/0110483 A1 * | 4/2021 | Shalev-Shwartz .... B60W 10/04 |

* cited by examiner

REDUNDANT ENVIRONMENT PERCEPTION TRACKING FOR AUTOMATED DRIVING SYSTEMS

CROSS-REFERENCE TO RELATED APPLICATION

This application is a continuation application of U.S. application Ser. No. 16/888,149, filed on May 29, 2020, now U.S. Pat. No. 10,981,568, which claims priority to and the benefit of U.S. Provisional Application No. 62/854,804, filed on May 30, 2019, the entire contents of which are incorporated herein by reference.

BACKGROUND OF THE INVENTION

Driver assistance and automated driving systems are becoming increasingly popular. Such systems depend on environmental information from a variety of different sensors in order to detect the surroundings of the vehicle. By detecting objects (and their movements) around the vehicle, the system is able to drive the vehicle according to the detected objects and their movements.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
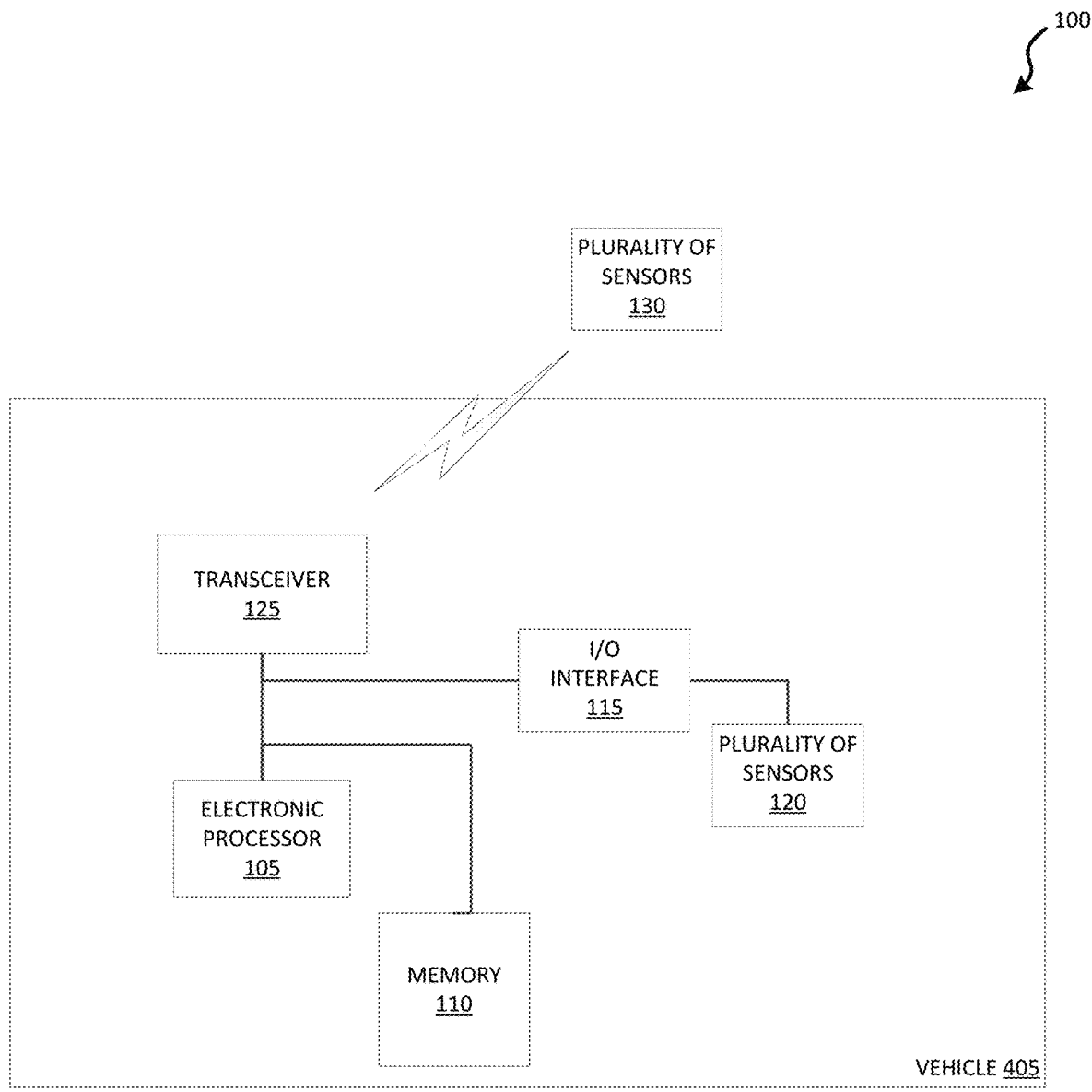
FIG. 1 is a block diagram of an automated driving system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, driver assistance and automated driving (herein referred to collectively as automated driving) depend on a variety of sensors with numerous overlapping field of views in order to detect objects (cars, pedestrians, lane markings, curbs, etc.) within an area surrounding the vehicle (herein referred to as the surrounding environment of the vehicle). Using the sensor information, the automated driving system determines the position and movement of the object. The system then controls (drives) the vehicle based on the determined position and/or movement. It is important that the position and movement of the object be determined accurately so that the vehicle is properly steered to avoid collision.

Additionally, while the present disclosure is focused on automated driving, the present disclosure is not limited to automated driving. For example, the present disclosure may also be used for detection of objects in surveillance applications (e.g., a plurality of sensors mounted on buildings and/vehicles to track pedestrians, vehicles, or other suitable objects) or any other application that determines an object state of an object. The surveillance aspect of the present disclosure is specifically set forth below with respect to enumerated Examples 21-40.

One example embodiment provides an automated driving system for a vehicle, the system including a plurality of sensors, a memory, and an electronic processor communicatively coupled to the memory and the plurality of sensors. The electronic processor is configured to receive, from the plurality of sensors, environmental information of a common field of view, generate, based on the environmental information, a plurality of hypotheses regarding an object within the common field of view, the plurality of hypotheses including at least one set of hypotheses excluding the environmental information from at least one sensor of a first sensor type, determine, based on a subset of the plurality of hypotheses, an object state of the object, wherein the subset includes the at least one set of hypotheses excluding the environmental information from the at least one sensor of the first sensor type, and perform a vehicular maneuver based on the object state that is determined.

Another example embodiment provides a method of operating an automated driving system. The method includes receiving, with an electronic processor, environmental information of a common field of view from a plurality of sensors. The method includes generating, with the electronic processor, a plurality of hypotheses regarding an object within the common field of view based on the environmental information, the plurality of hypotheses including at least one set of hypotheses excluding the environmental information from at least one sensor of a first sensor type. The method includes detecting, with the electronic processor, an error associated with the at least one sensor of the first sensor type. The method includes determining, with the electronic processor, an object state of the object based on a subset of the plurality of hypotheses, wherein the subset includes the at least one set of hypotheses excluding the environmental information from the at least one sensor of the first sensor type. The method also includes performing, with the electronic processor, a vehicular maneuver based on the object state that is determined.

Yet another example embodiment provides a non-transitory computer-readable medium comprising instructions that, when executed by an electronic processor, cause the electronic processor to perform a set of operations. The set of operations includes receiving environmental information of a common field of view from a plurality of sensors. The set of operations includes generating a plurality of hypotheses regarding an object within the common field of view based on the environmental information, the plurality of hypotheses including at least one set of hypotheses excluding the environmental information from at least one sensor of a first sensor type. The set of operations includes detecting an error associated with the at least one sensor of the first sensor type. The set of operations includes determining an object state of the object based on a subset of the plurality of hypotheses, wherein the subset includes the at least one set of hypotheses excluding the environmental information from the at least one sensor of the first sensor type. The set of operations also includes performing a vehicular maneuver based on the object state that is determined.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. For example, although the examples described herein are in terms of automated driving systems, in further embodiments, the methods described herein may be applied to driving assistance systems. It should also be understood that the term "vehicle" refers to any type of transportation system including, but not limited to, cars, motorcycles, drones, motorcycles, boats, and the like.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 is an example automated driving system 100, in accordance to some embodiments. The system 100 includes a vehicle 405 including an electronic processor 105, a memory 110, an input/output interface 115, a plurality of sensors 120, and a transceiver 125. In some embodiments, the system 100 also includes a plurality of sensors 130 that are mounted to infrastructure that are external to and nearby the vehicle 405. As explained above, in alternative embodiments, the system 100 includes a surveillance device instead of the vehicle 405, the surveillance device including an electronic processor, a memory, an input/output interface, a plurality of sensors, and a transceiver that are similar to the electronic processor 105, the memory 110, the input/output interface 115, the plurality of sensors 120, and the transceiver 125, respectively, as described herein.

The illustrated components, along with other various modules and components may be coupled to each other by or through one or more connections including, for example, control or data buses that enable communication therebetween. The use of control and data buses for the interconnection between and exchange of information among the various modules and components would be apparent to a person skilled in the art in view of the description provided herein. It should be understood that some components of the automated driving system 100 may be incorporated/integrated within a vehicle (for example, the vehicle 405 of FIG. 4), for example the vehicle's communication system and/or electrical system of a vehicle (not shown).

The electronic processor 105 obtains and provides information (for example, from the memory 110, the input/output interface 115, and/or the plurality of sensors 120), and processes the information by executing one or more software instructions or modules, capable of being stored, for example, in a random access memory ("RAM") area of the memory 110 or a read only memory ("ROM") of the memory 110 or another non-transitory computer readable medium (not shown). The software can include firmware, one or more applications, program data, filters, rules, one or more program modules, and other executable instructions. The electronic processor 105 is configured to retrieve from the memory 110 and execute, among other things, software related to the control processes and methods described herein.

The memory 110 can include one or more non-transitory computer-readable media, and includes a program storage area and a data storage area. The program storage area and the data storage area can include combinations of different types of memory, as described herein. The memory 110 may take the form of any non-transitory computer-readable medium.

The input/output interface 115 is configured to receive input, via one or more user input devices or interfaces, and to provide system output via one or more user output devices. The input/output interface 115 obtains information and signals from, and provides information and signals to (for example, over one or more wired and/or wireless connections) devices both internal and external to the vehicle 405. The input/output interface 115 is coupled to the plurality of sensors 120. The plurality of sensors 120 provide input to the input/output interface 115. The plurality of sensors 120 include different types of sensors positioned throughout the vehicle 405. The plurality of sensors 130 are mounted on infrastructure that is external to and nearby the vehicle 405. The plurality of sensors 120 and the plurality of sensors 130 may include, but are not limited to, radar sensors, lidar sensors, image sensors, ultra-sonic sensors, or other suitable sensors. It should be understood that each of the pluralities of sensors 120 and 130 may include more than one sensor of the same type.

For ease of description, the plurality of sensors 120 are described as having an overlapping field of view (the field of view being an area of the surrounding environment of the vehicle 405 in which the respective sensor is monitoring). Additionally, for ease of description and to avoid a redundant description, only the plurality of sensors 120 are described below. However, the description below is not limited to the plurality of sensors 120 and is equally applicable to a combination of the plurality of sensors 120 and the plurality of sensors 130, where the plurality of sensors 120 and the plurality of sensors 130 combine to form a larger plurality of sensors.

As described in more detail below, this overlapping area in which the field of views of each of the plurality of sensors 120 coincide is referred to as "a common field of view." The system 100 may also include additional sensors, separate from (but similar to) the plurality of sensors 120 described herein, that share a different common field of view. The range of the field of view of a sensor is dependent on the configuration of the sensor. Thus, the plurality of sensors 120 may have different size (and depth) field of views.

In some embodiments, the transceiver 125 is configured for wireless coupling to wireless networks. Alternatively, or in addition, the vehicle 405 may include a connector or port (not shown) for receiving a connection to a wired network (for example, Ethernet). The electronic processor 105 is configured to operate the transceiver 125 to receive input from and to provide system output, or a combination of both. The transceiver 125 obtains information and signals from, and provides information and signals to, (for example, over one or more wired and/or wireless connections) devices (including, in some embodiments, from the communication controller) both internal and external to the vehicle 405.

In some embodiments, the transceiver 125 may obtain information and signals from, and provide information and signals, to the plurality of sensors 130 that are mounted on infrastructure that is nearby and external to the vehicle 405. In these embodiments, the transceiver 125 is configured to communicate with a vehicle-to-everything (V2X) wireless network.

In other embodiments, the transceiver 125 may obtain information and signals from, and provide information and signals, to the plurality of sensors 130 that are mounted on other vehicles that are nearby and external to the vehicle 405. In these embodiments, the transceiver 125 is configured to communicate with a V2X wireless network and/or a vehicle-to-vehicle (V2V) wireless network.

Figure 2:
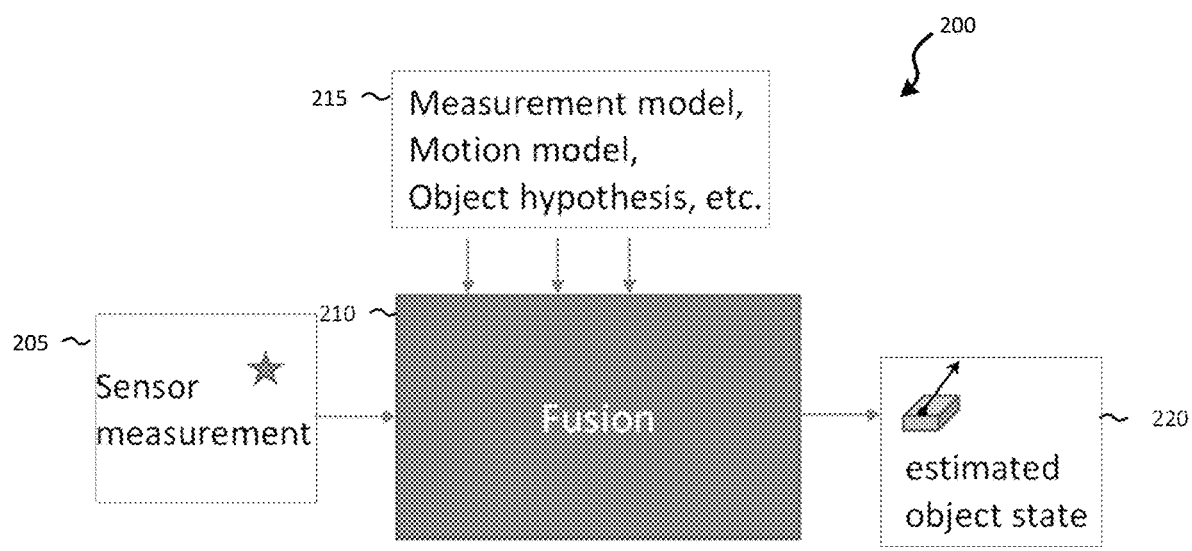
FIG. 2 is process model illustrating a process of determining an object based on environmental information implemented by the system of FIG. 1, in accordance with some embodiments.

FIG. 2 illustrates a process model 200 implemented by an automated driving system, in accordance with some embodiments. For ease of description, the model 200 shall be described in terms of the system 100 of FIG. 1, in particular, the electronic processor 105. As described above, the automated driving system 100 receives the information from the plurality of sensors 120 (sensor measurement 205). The object(s) within the environment surrounding the vehicle 405 may be determined by the automated driving system 100 formed through a fusion (block 210) of the data from the plurality of sensors 120.

Determining an object may include not only determining the position of the object relative to the vehicle 405, but also one or more of the speed and direction of movement of the object relative to the vehicle 405, and identifying what the object is (object classification) (for example, discerning whether the object is a car, motorcycle, person, or a bicycle). The determination of the one or more properties of the object that are described above are collectively referred to herein as an "object state." Based on the object state, a function executed by the electronic processor 105 determines whether there should be a reaction to the object and what the reaction to the object should be (output 220).

The fusion of sensor information (block 210) involves one or more predictive models, artificial intelligence, deep learning, and/or object tracking processes (block 215) that is performed by the electronic processor 105. In object tracking processes, when utilizing information from multiple sensors/sources, more than one possible object state may be determined by the electronic processor 105. Each possible state (determined here based on information from any number and type of the sensors 120) is referred to as an association hypothesis. An object state is then determined by the electronic processor 105 based on the association hypotheses. The association hypotheses (and thus, the determined object state) are monitored and updated periodically (each period referred to as a cycle) by the electronic processor 105 based on new information received from the sensors 120.

Some approaches for utilizing and managing multiple association hypotheses over time include, for example, Multiple Hypotheses Tracking (MHT) and Random Finite Set (RFS) processes including Labeled Multi-Bernoulli (LMB) filters. While multiple association hypotheses allow robustness in tracking, errors (especially in the case of erroneous but plausible measurements) in one sensor may not be determined immediately. This may be the case especially for systematic errors in a single sensor (for example, due to incorrect calibration, angle reading errors due to reflection of the detected surface, incorrect measurement of a specific object by deep learning, etc.) Such errors may result in an incorrect update to the determined object state and may result in track loss. Thus, the system 100 may perform an incorrect vehicle maneuver due to the update.

The above mentioned approaches are able to sort out erroneous hypotheses based on subsequent measurements over time. In particular, the tracking performance is improved by getting rid of (pruning) hypotheses that contain erroneous track-to-measurement association (random errors) while keeping several other hypotheses over time. A method to keep the number of hypotheses feasible is by merging of similar hypotheses while the unlikely hypotheses are pruned. However, in the case of systematic errors (like those described above), the above mentioned approaches may not detect such affected hypotheses.

As described herein, an "error" may be a problem with the sensor (usually a sensor fault), such as misalignment, or the "error" may be a mis-detection (which could be missing or offset from reality or similar). Mis-detections are expected and may be hard to distinguish from a sensor fault. Usually a sensor fault would be reported when a sensor has errors for most tracks at the same time or the sensor is missing for most tracks over a fault-maturation time.

Figure 3:
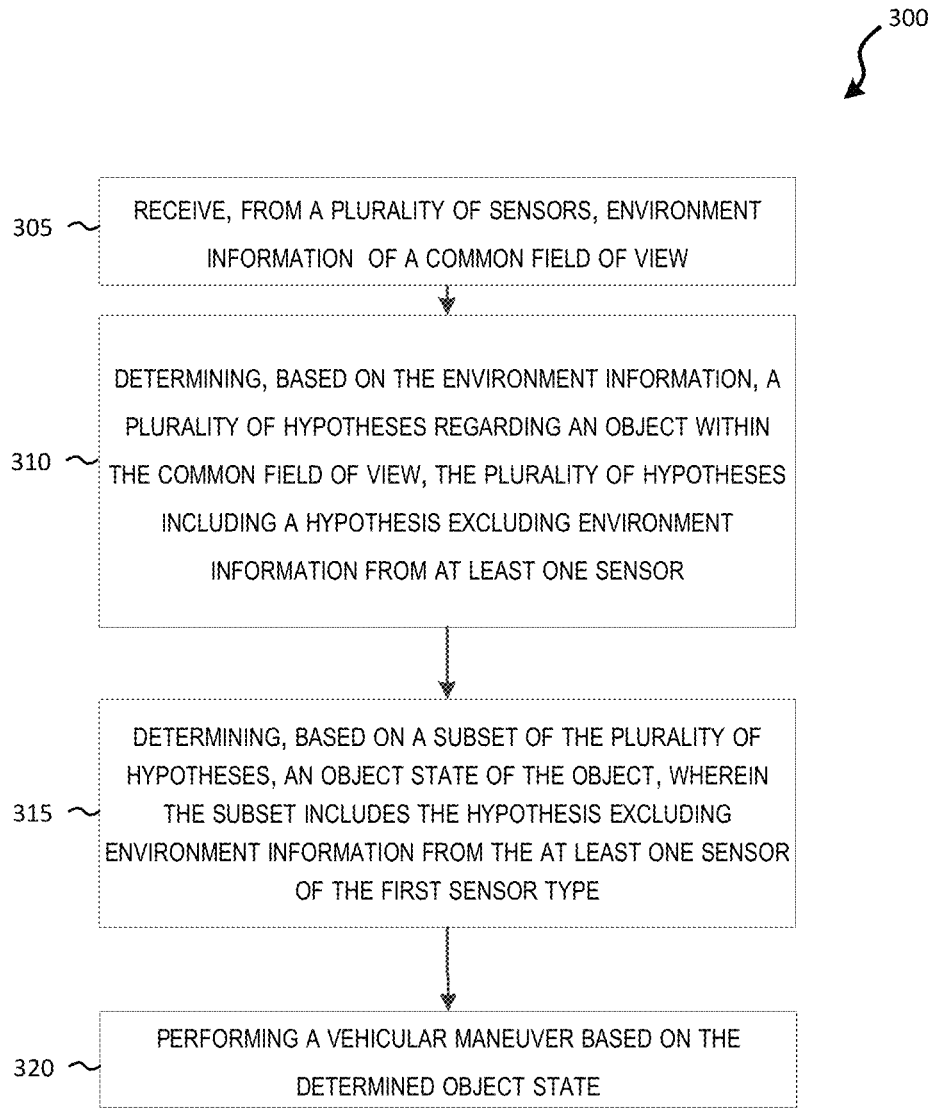
FIG. 3 is flowchart illustrating a method of processing redundant detected environmental information implemented by the system of FIG. 1, in accordance with some embodiments.

FIG. 3 is a flowchart illustrating an example method 300 of determining an object in an environment surrounding a vehicle, in accordance with some embodiments. The method 300 is robust against both types of the aforementioned "errors" because the method 300 builds up different hypotheses even in the presence of an undetected individual sensor error.

As an example, the method 300 is described as being performed by the system 100 and, in particular, the electronic processor 105. However, it should be understood that in some embodiments, portions of the method 300 may be performed by other devices.

Figure 4:
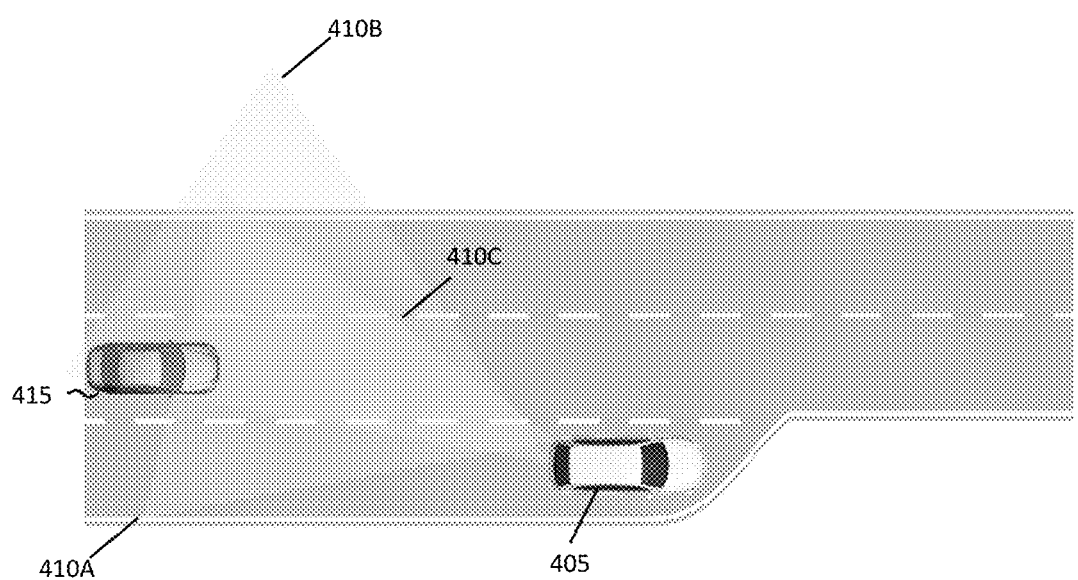
FIG. 4 is a diagram illustrating an environment surrounding a vehicle of the automated driving system of FIG. 1, in accordance with some embodiments.

For ease of description, the method 300 is further described in conjunction with FIG. 4. FIG. 4 illustrates the vehicle 405 and an object 415 (in the illustrated embodiment, a car). The object 415 is proximate (within the environment surrounding) the vehicle 405. As mentioned above, each of the plurality of sensors 120 has a field of view in which they monitor. In the illustrated embodiment, for example, field of view 410A corresponds to a first sensor 120A of the plurality of sensors 120 and the field of view 410B corresponds to a second sensor 120B of the plurality of sensors 120. The area in which the two intersect is referred to as the common field of view 410C. For ease of description, the common field of view 410C is described in terms of the first and second sensors 120A and 120B. It should be understood that, in further embodiments, more sensors may be associated with the common field of view 410C based on their respective field of view.

Returning to FIG. 3, at block 305, the electronic processor 105 receives, from the plurality of sensors 120, environmental information of a common field of view (for example, the common field of view 410C). As mentioned above, the plurality of sensors 120 include sensors of various types including, but not limited to, radar sensors, image sensors, lidar sensors, and other suitable sensors. Thus, the environmental information received from the plurality of sensors 120 may be captured in different media (for example, image-based, ultrasonic-based, etc.).

At block 310, the electronic processor 105 generates, based on the environmental information, a plurality of hypotheses regarding an object (for example, object 415 of FIG. 4) within the common field of view (for example, the common field of view 410C). The plurality of hypotheses includes at least one set of hypotheses that is determined using the received environmental information except for environmental information from at least one sensor. In other words, a hypothesis is generated using environmental information from all of the plurality of sensors 120 except for at least one of the plurality of sensors 120. Thus, in the case that an error associated with the at least one sensor is present or is detected, there is at least one set of hypotheses that is unaffected by any erroneous/inaccurate measurement performed by the at least one sensor.

For example, to detect the error associated with the at least one sensor of the first sensor type, the electronic processor 105 may be configured to detect a divergence of a second hypothesis of the plurality of hypotheses from a first hypothesis of the plurality of hypotheses while updating the plurality of hypotheses over time based on the additional environmental information that is received from the plurality of hypotheses. This error detection is described in greater detail below with respect to FIG. 5.

At block 315, the electronic processor 105 determines, based on a subset of the plurality of hypotheses, an object state of the object 415, the subset including the hypothesis that is determined using the received environmental information except for environmental information from at least one sensor. In other words, the electronic processor 105 is able to determine an object state without depending on an erroneous measurement.

At block 320, the electronic processor 105 performs a vehicular maneuver based on the determined object state. The vehicular maneuver includes steering and/or affecting the speed (accelerating/braking) of the vehicle 405 based on the determined object state. For example, in FIG. 4, the determined object state of object 415 may be that the object 415 is a vehicle in the left lane, driving straight at x miles per hour. The electronic processor 105 may accordingly control the vehicle 405 to remain stopped in the right lane and merge into the left lane only after the object 415 has passed the vehicle 405. The determination of the vehicular maneuver by the electronic processor 105 based on the determined object state may be performed using one or more automated driving techniques which, for sake of brevity, are not discussed here.

In some embodiments, an additional hypothesis is determined for every sensor, each of which excluding information received from the respective sensor. In further embodiments, an additional hypothesis is calculated that excludes information from one or more sensors of the plurality of sensors 120 that are of a same sensor type. For example, the types of sensors of the plurality of sensors 120 may include a combination of radar, video, and lidar. Thus, the electronic processor 105 would determine a "no radar information" hypothesis, a "no video information" hypothesis, and a "no lidar information" hypothesis along with hypotheses that incorporate measurements from all sensors of the plurality of sensors 120.

Additionally or alternatively, in some examples, the plurality of sensors 120 may include combination of sensor types or a single sensor type (e.g., only lidar, only radar, or only video). In these examples, the electronic processor 105 may determine a "no_lidar1" hypothesis, a "no_lidar2" hypothesis, and a "no_lidar3" hypothesis along with hypotheses that incorporate measurements from all sensors of the plurality of sensors 120. Thus, in response to detection of an error associated with any one sensor (or type), the hypothesis (or hypotheses) that were not determined based on information from the defective sensor(s) may be utilized in the determination of the object state (while one or more of the hypotheses that are affected/are based on such information may be excluded from the determination of the object state). Put simply, the electronic processor 105 may determine an object state based on hypotheses that exclude environmental information from a sensor type, or at a more granular-level, based on hypotheses that exclude environmental information from a specific defective sensor.

Within a mixture representation of a track of an object (for example, in the case of an LMB filter), the method 300 may be applied by storing the sensor types incorporated in each component of the mixture distribution and avoiding pruning and merging of specific components regardless of weight and distance to other state components. In order to save memory and computational load, the electronic processor 105, in some embodiments, assigns flags (for example "consistent with no radar") to components for which the associated sensor measurement (here, radar) had a very high likelihood. In the case of Gaussian distributed states, this corresponds to a very small Mahalanobis distance which corresponds to the fact that the expected measurement and the actual measurement are almost identical. In some embodiments, the electronic processor 105 is further configured to determine sensor degradation based on a detected error. In particular, the distance between the state estimates of the different state components of an LMB (which can be reduced to a Bernoulli distribution if the components are reduced to one single object for each Gaussian mixture distribution) may be used as a feature for sensor degradation recognition. Possible ways to recognize this are time series analyzations or the permanent deviation of more than two sensors.

Figure 5:
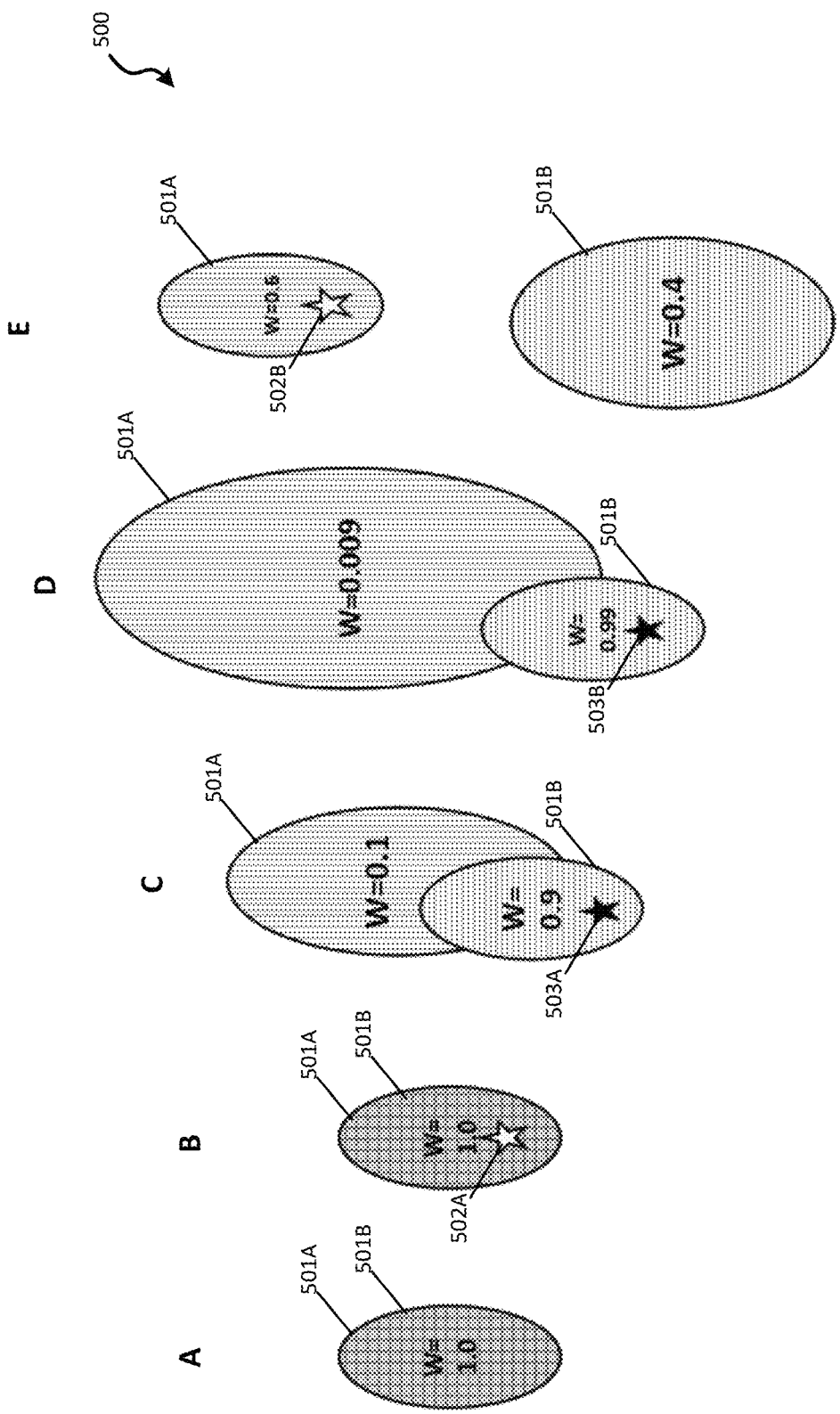
FIG. 5 is graph illustrating a plurality of hypothesis generated according to the method of FIG. 2, in accordance with some embodiments.

FIG. 5 is an illustration of a mixture distribution over time 500 (illustrated as increasing left to right) using a first type of sensor and a second type of sensor (for example, radar and lidar, respectively). At time step A, the measurements of the two sensor types are consistent with each other and thus their respective plurality of hypotheses 501A and 501B coincide (illustrated as an overlapping circle). At time step B, a measurement 502A from the first sensor type is received (denoted as a white star). The measurement 502A does not conflict with the hypotheses 501B of the second sensor type and thus, the hypotheses of both sensor types continue to coincide at time step B. At time step C, a measurement from the second type of sensor (the measurement being illustrated as a black star 503A) causes the hypotheses 501B of the second sensor type to deviate from the hypothesis 501A of the first sensor type. Since a portion of the hypotheses of the first sensor type exclude information from the second sensor type, the overlapping hypotheses at time step C may not be merged and the very unlikely hypotheses 501A (the probability of which decreased due to a second received measurement of the second sensor type denoted as star 503B) at time step D are not pruned. At step E, a new measurement from the first sensor (star 502B) is incorporated and the hypotheses 501A of the first sensor type are thus not affected by the systematic error experienced in the second sensor type.

The following are enumerated examples of systems, methods, and non-transitory computer-readable media according to various aspects of the present disclosure.

Example 1: An automated driving system for a vehicle, the system comprising: a plurality of sensors; a memory; and an electronic processor communicatively coupled to the memory and the plurality of sensors, the electronic processor configured to receive, from the plurality of sensors, environmental information of a common field of view, generate, based on the environmental information, a plurality of hypotheses regarding an object within the common field of view, the plurality of hypotheses including at least one set of hypotheses excluding the environmental information from at least one sensor of a first sensor type, determine, based on a subset of the plurality of hypotheses, an object state of the object, wherein the subset includes the at least one set of hypotheses excluding the environmental information from the at least one sensor of the first sensor type, and perform a vehicular maneuver based on the object state that is determined.

Example 2: The automated driving system of Example 1, wherein the electronic processor is further configured to update the plurality of hypotheses over time based on additional environmental information that is received from the plurality of sensors.

Example 3: The automated driving system of Example 2, wherein the electronic processor is further configured to detect an error associated with the at least one sensor of the first sensor type, and wherein, to determine, based on the subset of the plurality of hypotheses, the object state of the object is in response to detecting the error associated with the at least one sensor of the first sensor type.

Example 4: The automated driving system of any of Examples 1 through 3, wherein the plurality of sensors includes two or more sensors selected from a group consisting of: one or more radar sensors, one or more lidar sensors, one or more image sensors, and one or more ultra-sonic sensors.

Example 5: The automated driving system of any of Examples 1 through 4, wherein a first sensor of the plurality of sensors is a radar sensor, and wherein a second sensor of the plurality of sensors is a lidar sensor.

Example 6: The automated driving system of Example 5, wherein, to generate, based on the environmental information, the plurality of hypotheses regarding the object within the common field of view, the plurality of hypotheses including the at least one set of hypotheses excluding the environmental information from the at least one sensor of the first sensor type, the electronic processor is further configured to generate a first set of hypotheses of the plurality of hypotheses based at least in part on the environmental information that is received from the radar sensor and the lidar sensor, generate a second set of hypotheses of the plurality of hypotheses based at least in part on the environmental information that is received from the radar sensor and not based on the environmental information that is received from the lidar sensor, and generate a third set of hypotheses of the plurality of hypotheses based at least in part on the environmental information that is received from the lidar sensor and not based on the environmental information that is received from the radar sensor.

Example 7: The automated driving system of Example 6, wherein, to determine, based on the subset of the plurality of hypotheses, the object state of the object, wherein the subset includes the at least one set of hypotheses excluding the environmental information from the at least one sensor of the first sensor type, the electronic processor is further configured to determine the object state of the object based on the third set of hypotheses.

Example 8: The automated driving system of any of Examples 1 through 7, wherein the subset includes other hypotheses including the environmental information from other sensors of the first sensor type.

Example 9. A method of operating an automated driving system, the method comprising: receiving, with an electronic processor, environmental information of a common field of view from a plurality of sensors; generating, with the electronic processor, a plurality of hypotheses regarding an object within the common field of view based on the environmental information, the plurality of hypotheses including at least one set of hypotheses excluding the environmental information from at least one sensor of a first sensor type; determining, with the electronic processor, an object state of the object based on a subset of the plurality of hypotheses, wherein the subset includes the at least one set of hypotheses excluding the environmental information from the at least one sensor of the first sensor type; and performing, with the electronic processor, a vehicular maneuver based on the object state that is determined.

Example 10: The method of Example 9, further comprising: updating, with the electronic processor, the plurality of hypotheses over time based on additional environmental information that is received from the plurality of sensors.

Example 11: The method of Example 10, further comprising: detecting, with the electronic processor, an error associated with the at least one sensor of the first sensor type, wherein determining the object state of the object based on the subset of the plurality of hypotheses is in response to detecting the error associated with the at least one sensor of the first sensor type.

Example 12: The method of any of Examples 9 through 11, wherein the plurality of sensors includes two or more sensors selected from a group consisting of: one or more radar sensors, one or more lidar sensors, one or more image sensors, and one or more ultra-sonic sensors.

Example 13: The method of any of Examples 9 through 12, wherein a first sensor of the plurality of sensors is a radar sensor, and wherein a second sensor of the plurality of sensors is a lidar sensor.

Example 14: The method of Example 13, wherein generating the plurality of hypotheses regarding the object within the common field of view based on the environmental information further includes generating a first set of hypotheses of the plurality of hypotheses based at least in part on the environmental information that is received from the radar sensor and the lidar sensor, generating a second set of hypotheses of the plurality of hypotheses based at least in part on the environmental information that is received from the radar sensor and not based on the environmental information that is received from the lidar sensor, and generating a third set of hypotheses of the plurality of hypotheses based at least in part on the environmental information that is received from the lidar sensor and not based on the environmental information that is received from the radar sensor.

Example 15: The method of Example 14, wherein determining the object state of the object based on the subset of the plurality of hypotheses, wherein the subset includes the at least one set of hypotheses excluding the environmental information from the at least one sensor of the first sensor type further includes determining the object state of the object based on the third set of hypotheses.

Example 16: The method of any of Examples 9 through 15, wherein the subset includes other hypotheses including the environmental information from other sensors of the first sensor type.

Example 17: A non-transitory computer-readable medium comprising instructions that, when executed by an electronic processor, cause the electronic processor to perform a set of operations comprising: receiving environmental information of a common field of view from a plurality of sensors; generating a plurality of hypotheses regarding an object within the common field of view based on the environmental information, the plurality of hypotheses including at least one set of hypotheses excluding the environmental information from at least one sensor of a first sensor type; determining an object state of the object based on a subset of the plurality of hypotheses, wherein the subset includes the at least one set of hypotheses excluding the environmental information from the at least one sensor of the first sensor type; and performing a vehicular maneuver based on the object state that is determined.

Example 18: The non-transitory computer-readable medium of Example 17, wherein the set of operations further includes updating the plurality of hypotheses over time based on additional environmental information that is received from the plurality of sensors.

Example 19: The non-transitory computer-readable medium of Example 18, wherein the set of operations further includes detecting an error associated with the at least one sensor of the first sensor type, wherein determining the object state of the object based on the subset of the plurality of hypotheses is in response to detecting the error associated with the at least one sensor of the first sensor type.

Example 20: The non-transitory computer-readable medium of any of Examples 17 through 19, wherein the subset includes other hypotheses including the environmental information from other sensors of the first sensor type.

Example 21: A surveillance system, the system comprising: a plurality of sensors; a memory; and an electronic processor communicatively coupled to the memory and the plurality of sensors, the electronic processor configured to receive, from the plurality of sensors, environmental information of a common field of view, generate, based on the environmental information, a plurality of hypotheses regarding an object within the common field of view, the plurality of hypotheses including at least one set of hypotheses excluding the environmental information from at least one sensor of a first sensor type, determine, based on a subset of the plurality of hypotheses, an object state of the object, wherein the subset includes the at least one set of hypotheses excluding the environmental information from the at least one sensor of the first sensor type, and track the object based on the object state that is determined.

Example 22: The surveillance system of Example 21, wherein the electronic processor is further configured to update the plurality of hypotheses over time based on additional environmental information that is received from the plurality of sensors.

Example 23: The surveillance system of Example 22, wherein the electronic processor is further configured to detect an error associated with the at least one sensor of the first sensor type, and wherein, to determine, based on the subset of the plurality of hypotheses, the object state of the object is in response to detecting the error associated with the at least one sensor of the first sensor type.

Example 24: The surveillance system of any of Examples 21 through 23, wherein the plurality of sensors includes two or more sensors selected from a group consisting of: one or more radar sensors, one or more lidar sensors, one or more image sensors, and one or more ultra-sonic sensors.

Example 25: The surveillance system of any of Examples 21 through 24, wherein a first sensor of the plurality of sensors is a radar sensor, and wherein a second sensor of the plurality of sensors is a lidar sensor.

Example 26: The surveillance system of Example 25, wherein, to generate, based on the environmental information, the plurality of hypotheses regarding the object within the common field of view, the plurality of hypotheses including the at least one set of hypotheses excluding the environmental information from the at least one sensor of the first sensor type, the electronic processor is further configured to generate a first set of hypotheses of the plurality of hypotheses based at least in part on the environmental information that is received from the radar sensor and the lidar sensor, generate a second set of hypotheses of the plurality of hypotheses based at least in part on the environmental information that is received from the radar sensor and not based on the environmental information that is received from the lidar sensor, and generate a third set of hypotheses of the plurality of hypotheses based at least in part on the environmental information that is received from the lidar sensor and not based on the environmental information that is received from the radar sensor.

Example 27: The surveillance system of Example 26, wherein, to determine, based on the subset of the plurality of hypotheses, the object state of the object, wherein the subset includes the at least one set of hypotheses excluding the environmental information from the at least one sensor of the first sensor type, the electronic processor is further configured to determine the object state of the object based on the third set of hypotheses.

Example 28: The surveillance system of any of Examples 21 through 27, wherein the subset includes other hypotheses including the environmental information from other sensors of the first sensor type.

Example 29. A method of operating an surveillance system, the method comprising: receiving, with an electronic processor, environmental information of a common field of view from a plurality of sensors; generating, with the electronic processor, a plurality of hypotheses regarding an object within the common field of view based on the environmental information, the plurality of hypotheses including at least one set of hypotheses excluding the environmental information from at least one sensor of a first sensor type; determining, with the electronic processor, an object state of the object based on a subset of the plurality of hypotheses, wherein the subset includes the at least one set of hypotheses excluding the environmental information from the at least one sensor of the first sensor type; and tracking, with the electronic processor, the object based on the object state that is determined.

Example 30: The method of Example 29, further comprising: updating, with the electronic processor, the plurality of hypotheses over time based on additional environmental information that is received from the plurality of sensors.

Example 31: The method of Example 30, further comprising: detecting, with the electronic processor, an error associated with the at least one sensor of the first sensor type, wherein determining the object state of the object based on the subset of the plurality of hypotheses is in response to detecting the error associated with the at least one sensor of the first sensor type.

Example 32: The method of any of Examples 29 through 31, wherein the plurality of sensors includes two or more sensors selected from a group consisting of: one or more radar sensors, one or more lidar sensors, one or more image sensors, and one or more ultra-sonic sensors.

Example 33: The method of any of Examples 29 through 32, wherein a first sensor of the plurality of sensors is a radar sensor, and wherein a second sensor of the plurality of sensors is a lidar sensor.

Example 34: The method of Example 33, wherein generating the plurality of hypotheses regarding the object within the common field of view based on the environmental information further includes generating a first set of hypotheses of the plurality of hypotheses based at least in part on the environmental information that is received from the radar sensor and the lidar sensor, generating a second set of hypotheses of the plurality of hypotheses based at least in part on the environmental information that is received from the radar sensor and not based on the environmental information that is received from the lidar sensor, and generating a third set of hypotheses of the plurality of hypotheses based at least in part on the environmental information that is received from the lidar sensor and not based on the environmental information that is received from the radar sensor.

Example 35: The method of Example 34, wherein determining the object state of the object based on the subset of the plurality of hypotheses, wherein the subset includes the at least one set of hypotheses excluding the environmental information from the at least one sensor of the first sensor type further includes determining the object state of the object based on the third set of hypotheses.

Example 36: The method of any of Examples 29 through 35, wherein the subset includes other hypotheses including the environmental information from other sensors of the first sensor type.

Example 37: A non-transitory computer-readable medium comprising instructions that, when executed by an electronic processor, cause the electronic processor to perform a set of operations comprising: receiving environmental information of a common field of view from a plurality of sensors; generating a plurality of hypotheses regarding an object within the common field of view based on the environmental information, the plurality of hypotheses including at least one set of hypotheses excluding the environmental information from at least one sensor of a first sensor type; determining an object state of the object based on a subset of the plurality of hypotheses, wherein the subset includes the at least one set of hypotheses excluding the environmental information from the at least one sensor of the first sensor type; and tracking the object based on the object state that is determined.

Example 38: The non-transitory computer-readable medium of Example 37, wherein the set of operations further includes updating the plurality of hypotheses over time based on additional environmental information that is received from the plurality of sensors.

Example 39: The non-transitory computer-readable medium of Example 38, wherein the set of operations further includes detecting an error associated with the at least one sensor of the first sensor type, wherein determining the object state of the object based on the subset of the plurality of hypotheses is in response to detecting the error associated with the at least one sensor of the first sensor type.

Example 40: The non-transitory computer-readable medium of any of Examples 37 through 39, wherein the subset includes other hypotheses including the environmental information from other sensors of the first sensor type.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A surveillance system, the system comprising:
a plurality of sensors;
a memory; and
an electronic processor communicatively coupled to the memory and the plurality of sensors, the electronic processor configured to
receive, from the plurality of sensors, environmental information of a common field of view,
generate, based on the environmental information, a plurality of hypotheses regarding an object within the common field of view, the plurality of hypotheses including at least one set of hypotheses excluding the environmental information from at least one sensor of a first sensor type,
determine, based on a subset of the plurality of hypotheses, an object state of the object,
wherein the subset includes the at least one set of hypotheses excluding the environmental information from the at least one sensor of the first sensor type, and
track the object based on the object state that is determined.

2. The surveillance system of claim 1, wherein the electronic processor is further configured to update the plurality of hypotheses over time based on additional environmental information that is received from the plurality of sensors.

3. The surveillance system of claim 2, wherein the electronic processor is further configured to
detect an error associated with the at least one sensor of the first sensor type, and
wherein, to determine, based on the subset of the plurality of hypotheses, the object state of the object is in response to detecting the error associated with the at least one sensor of the first sensor type.

4. The surveillance system of claim 1, wherein the plurality of sensors includes two or more sensors selected from a group consisting of: one or more radar sensors, one or more lidar sensors, one or more image sensors, and one or more ultra-sonic sensors.

5. The surveillance system of claim 1, wherein a first sensor of the plurality of sensors is a radar sensor, and wherein a second sensor of the plurality of sensors is a lidar sensor.

6. The surveillance system of claim 5, wherein, to generate, based on the environmental information, the plurality of hypotheses regarding the object within the common field of view, the plurality of hypotheses including the at least one set of hypotheses excluding the environmental information from the at least one sensor of the first sensor type, the electronic processor is further configured to
generate a first set of hypotheses of the plurality of hypotheses based at least in part on the environmental information that is received from the radar sensor and the lidar sensor,
generate a second set of hypotheses of the plurality of hypotheses based at least in part on the environmental information that is received from the radar sensor and not based on the environmental information that is received from the lidar sensor, and
generate a third set of hypotheses of the plurality of hypotheses based at least in part on the environmental information that is received from the lidar sensor and not based on the environmental information that is received from the radar sensor.

7. The surveillance system of claim 6, wherein, to determine, based on the subset of the plurality of hypotheses, the object state of the object, wherein the subset includes the at least one set of hypotheses excluding the environmental information from the at least one sensor of the first sensor type, the electronic processor is further configured to determine the object state of the object based on the third set of hypotheses.

8. The surveillance system of claim 1, wherein the subset includes other hypotheses including the environmental information from other sensors of the first sensor type.

9. A method of operating an surveillance system, the method comprising:
receiving, with an electronic processor, environmental information of a common field of view from a plurality of sensors;
generating, with the electronic processor, a plurality of hypotheses regarding an object within the common field of view based on the environmental information, the plurality of hypotheses including at least one set of hypotheses excluding the environmental information from at least one sensor of a first sensor type;
determining, with the electronic processor, an object state of the object based on a subset of the plurality of hypotheses, wherein the subset includes the at least one set of hypotheses excluding the environmental information from the at least one sensor of the first sensor type; and
tracking, with the electronic processor, the object based on the object state that is determined.

10. The method of claim 9, further comprising: updating, with the electronic processor, the plurality of hypotheses over time based on additional environmental information that is received from the plurality of sensors.

11. The method of claim 10, further comprising: detecting, with the electronic processor, an error associated with the at least one sensor of the first sensor type, wherein determining the object state of the object based on the subset of the plurality of hypotheses is in response to detecting the error associated with the at least one sensor of the first sensor type.

12. The method of claim 9, wherein the plurality of sensors includes two or more sensors selected from a group consisting of: one or more radar sensors, one or more lidar sensors, one or more image sensors, and one or more ultra-sonic sensors.

13. The method of claim 9, wherein a first sensor of the plurality of sensors is a radar sensor, and wherein a second sensor of the plurality of sensors is a lidar sensor.

14. The method of claim 13, wherein generating the plurality of hypotheses regarding the object within the common field of view based on the environmental information further includes
generating a first set of hypotheses of the plurality of hypotheses based at least in part on the environmental information that is received from the radar sensor and the lidar sensor,
generating a second set of hypotheses of the plurality of hypotheses based at least in part on the environmental information that is received from the radar sensor and not based on the environmental information that is received from the lidar sensor, and generating a third set of hypotheses of the plurality of hypotheses based at least in part on the environmental information that is received from the lidar sensor and not based on the environmental information that is received from the radar sensor.

15. The method of claim 14, wherein determining the object state of the object based on the subset of the plurality of hypotheses, wherein the subset includes the at least one set of hypotheses excluding the environmental information from the at least one sensor of the first sensor type further includes determining the object state of the object based on the third set of hypotheses.

16. The method of claim 9, wherein the subset includes other hypotheses including the environmental information from other sensors of the first sensor type.

17. A non-transitory computer-readable medium comprising instructions that, when executed by an electronic processor, cause the electronic processor to perform a set of operations comprising:

receiving environmental information of a common field of view from a plurality of sensors;

generating a plurality of hypotheses regarding an object within the common field of view based on the environmental information, the plurality of hypotheses including at least one set of hypotheses excluding the environmental information from at least one sensor of a first sensor type;

determining an object state of the object based on a subset of the plurality of hypotheses, wherein the subset includes the at least one set of hypotheses excluding the environmental information from the at least one sensor of the first sensor type; and tracking the object based on the object state that is determined.

18. The non-transitory computer-readable medium of claim 17, wherein the set of operations further includes updating the plurality of hypotheses over time based on additional environmental information that is received from the plurality of sensors.

19. The non-transitory computer-readable medium of claim 18, wherein the set of operations further includes detecting an error associated with the at least one sensor of the first sensor type, wherein determining the object state of the object based on the subset of the plurality of hypotheses is in response to detecting the error associated with the at least one sensor of the first sensor type.

20. The non-transitory computer-readable medium of claim 17, wherein the subset includes other hypotheses including the environmental information from other sensors of the first sensor type.

* * * * *